| United States Patent [19] | [11] Patent Number: 4,631,330 |
| Dietz et al. | [45] Date of Patent: Dec. 23, 1986 |

[54] ADDITION COMPOUNDS AND PROCESS FOR THEIR PREPARATION

[75] Inventors: Erwin Dietz, Kelkheim; Albert Münkel, Frankfurt am Main; Otmar Hafner, Glashütten; Wolfgang Rieper, Frankfurt am Main; Adolf Kroh, Selters, all of Fed. Rep. of Germany

[73] Assignee: Hoechst Aktiengesellschaft, Fed. Rep. of Germany

[21] Appl. No.: 809,529

[22] Filed: Dec. 16, 1985

[30] Foreign Application Priority Data

Dec. 18, 1984 [DE] Fed. Rep. of Germany ....... 3446084

[51] Int. Cl.$^4$ ............................................. C08G 18/38

[52] U.S. Cl. ........................................ 528/49; 524/590

[58] Field of Search ............................................ 528/49

[56] References Cited

U.S. PATENT DOCUMENTS 3,294,713 12/1966 Hudson et al. ........................ 528/49
4,393,186 7/1983 Damico et al. ....................... 528/49

Primary Examiner—Maurice J. Welsh
Attorney, Agent, or Firm—Connolly and Hutz

[57] ABSTRACT

Addition products formed from polymeric diphenylmethane 4,4'-diisocyanates, amines, monoactive and diactive polymers are suitable for use as dispersants for solids in organic media.

10 Claims, No Drawings

ADDITION COMPOUNDS AND PROCESS FOR THEIR PREPARATION

The present invention relates to addition compounds comprising 50 equivalent % of structural units R of the formula

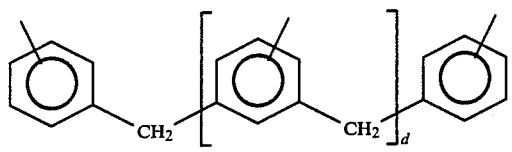

5 to 40, preferably 7 to 35, equivalent % of structural units of the formula (I)

$$-NH-CO-R^1-R^3-R^2 \quad (I)$$

5 to 40, preferably 7 to 30, equivalent % of structural units of the formula (II)

$$-NH-CO-(R^4)_a-R^5-R^6 \quad (II)$$

0 25, preferably 0 to 15, equivalent % of structural units of the formula (III)

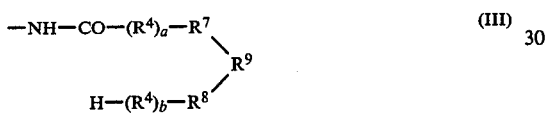

and/or
0 to 25, preferably 1 to 15, equivalent % of structural units of the formula (IV)

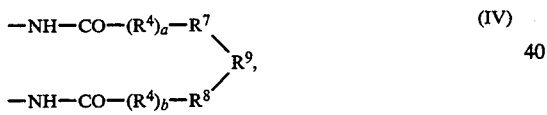

where (III) and (IV) cannot at the same time be 0 equivalent % and the sum (I)+(II)+(III)+(IV) is 50 equivalent %, having a molecular weight of 1,500 to 25,000, soluble in inert solvents, where d stands for a whole number from 0 to 6, $R^1$ stands for a direct bond, —O—, —NR$^{10}$R$^{11}$—, in which R$^{10}$ denotes a direct bond or C$_1$-C$_{20}$-alkylene and R$^{11}$ denotes —H, —OH or —NH$_2$, $R^2$ stands for —H, —OH or —N(R$^3$R$^{11}$)(R$^{10}$R$^{12}$), in which R$^{10}$ and R$^{11}$ have the above meaning and R$^{12}$ denotes —H, —OH or —NH$_2$ and $R^3$ denotes a direct bond or C$_1$-C$_6$-alkylene, or $R^2$ stands for a saturated or unsaturated heterocyclic or an aromatic ring system having 2 to 16 carbon atoms which may be substituted by —R$^{13}$, halogen, —OR$^{13}$, —NR$^{13}$R$^{14}$, —COOR$^{13}$, —CONR$^{13}$R$^{14}$, —NR$^{13}$—COR$^{14}$, —CN, —CF$_3$ or —NO$_2$, where
R$^{13}$ and R$^{14}$ denote independently of each other —H or C$_1$-C$_4$-alkyl and where at least one of the radicals R$^1$ and R$^2$ must contain a nitrogen atom and R$^1$ is a direct bond only when R$^2$ stands for a heterocyclic ring system which is attached via the ring nitrogen, and R$^3$ likewise stands for a direct bond, R$^4$ stand independently of each other for —O—R$^{15}$—, —O—R$^{15}$—CO— or —O—R$^{15}$—O—CO—R$^{16}$—CO—,
where R$^{15}$ denotes C$_2$-C$_{20}$-alkylene or phenylethylene and R$^{16}$ denotes a direct bond, C$_1$-C$_{12}$-alkylene, C$_6$-C$_{12}$-arylene or C$_6$-C$_{12}$-aralkylene and where the radicals R$^4$ in the formulae (II), (III) and (IV) can in each case be different, a stands for a whole number from 2 to 200, R$^5$ stands for —O—, —S—, —NH— or —NR'—, where R' has one of the meanings mentioned for R$^6$, R$^6$ stands for a monovalent aliphatic, aromatic or araliphatic radical having 1 to 40 carbon atoms, and R$^7$ and R$^8$ stand independently of each other for —O—, —S—, —NR''— or a direct bond, where R'' has one of the meanings mentioned for R$^6$, R$^9$ stands for a direct bond or a divalent aliphatic or araliphatic radical having 2 to 200 carbon atoms, where R$^7$, R$^8$ and R$^9$ are not a direct bond at the same time, and b stands for a whole number from 2 to 200.

For the purposes of the present invention, equivalent % is the quotient $$\frac{[\text{Equivalents of structural units bonded to reacting groups}] \times 100\%}{[\text{Sum of all equivalents of structural units bonded to reacting groups}]}$$

The compounds have inter alia the following structures (V), (VI) and (VII)

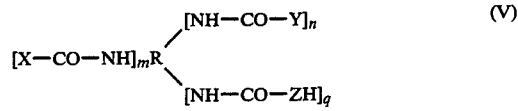

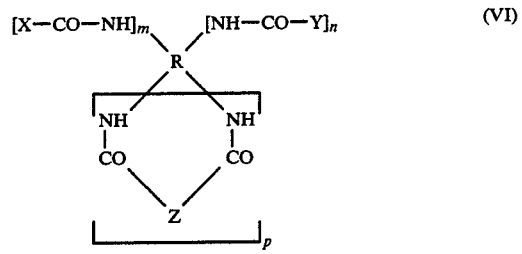

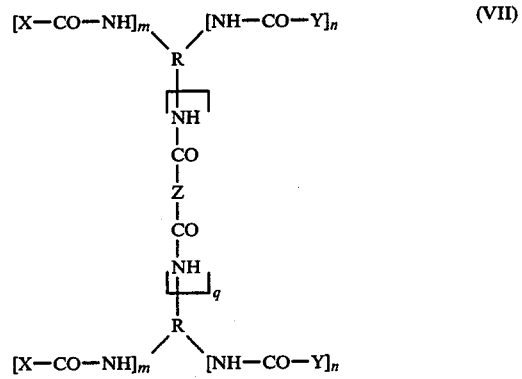

in which R has the meaning mentioned above and in which n+m+q and n+m+p stand for a number from 2 to 8, in accordance with the valence of the radical R, X stands for —R$^1$—R$^3$—R$^2$, Y stands for —$(R^4)_a$—$R^5$—$R^6$ and
Z stands for

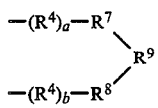

There are already known polyesters which are suitable for use as assistants for dispersing solids in organic solvents (cf. U.S. Pat. No. 3,970,687). They conform to the general formula

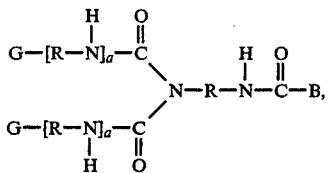

in which G is the residue of a basic radical and B is a segment of a polyester or copolyester.

They are formed by condensation of a polyester having a terminal OH group with a triisocyanate.

Furthermore, there are known polymeric materials which are likewise suitable for use as assistants for dispersing solids in organic solvents (cf. U.S. Pat. No. 4,032,698). They conform to the general formula

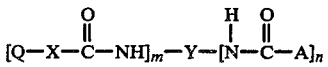

in which
Q represents the radical of a polymer of an ethylenically unsaturated monomer,
X represents the radical of a chain transfer agent,
Y represents the radical of a di-, tri- or tetra-isocyanate after removal of the isocyanate groups and
A represents the radical of a base which, before reaction, had a $pK_a$ of 5 to 14.

These compounds are readily soluble in organic solvents.

These assistants for dispersing solids lead, in a number of pigments and binder systems, only to small or no improvements in the application properties (flocculation resistance, gloss behavior, tinctorial strength, compatibility with binders and rheological properties).

The addition compounds according to the invention, by contrast, are highly compatible with numerous binder systems. The solids dispersed therein, in particular pigments, are distinguished by high flocculation resistance and high tinctorial strength. The binder systems pigmented in this way have good rheological properties and lead to paint films having high gloss.

The addition compounds according to the invention are built up from polyfunctional isocyanates and the components HX, HY and HZH, where X, Y and Z have the previously mentioned meaning.

1. The polyfunctional isocyanates to be used according to the invention can be built up in known manner by phosgenation of condensation products of aniline and formaldehyde. They have the idealized structure

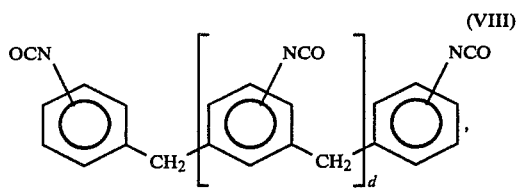

where the number d stands for a whole number from 0 to 6.

2. Addition compounds according to the invention contain the monovalent radical of an amino compound which contains groups which can react with isocyanate groups. These amino compounds HX can be summarized in the following general formula:

$$H—R^1—R^3—R^2 \qquad (IX)$$

In this formula, $R^1$, $R^2$ and $R^3$ have the previously listed meaning.

Examples of amines of the formula (IX) are the following representatives:

2.1 aliphatic amines where, in the formula (IX), $R^2$ stands for —H, —OH or —$N(R^3R^{11})(R^{10}R^{12})$, such as ammonia, hydrazine, hydroxylamine, ethanolamine, diethanolamine, triethanolamine, hydroxyethyldimethylamine, 1,2-diaminoethane, diethylenetriamine, dimethyl-(2-aminoethyl)-amine, diethyl(2-aminoethyl)-amine, hydroxyethyldiethylamine, alkyl- and alkenylamines having 1 to 20 carbon atoms and their hydroxyethyl and aminopropyl derivatives.

2.2 aromatic amines where, in the formula (IX), $R^2$ stands for an aromatic ring system which can carry the previously listed substituents, such as aniline, alkylanilines (toluidines, xylidines and N-alkylanilines), chloro-, dichloro- and trichloro-anilines, bromo- and fluoro-anilines, aminobenzotrifluorides, aminophenols and aminophenol ethers (anisidines and phenetidines), aminohydroquinone dimethyl ether, aminoresorcinol dimethyl ether, aminobenzoate esters, aminobenzamides, aminophthalate esters, aminobenzonitriles, nitroanilines and dinitroanilines, aminodimethylanilines, aminonaphthols, aminoanthraquinones, aminooxazolinones and aminobenzoxazolinones and in particular heterocyclic amino compounds such as for example aminopyridines, aminocarbazoles, aminoquinolines, aminoacridines, aminopyrimidines, aminoquinoxalines, aminopteridines, aminopurines (adenine), aminotriazoles, aminobenzimidazoles, aminothiazoles, aminopyrazoles, aminopyrazolones, aminothiadiazoles.

2.3 heterocyclic amines where, in the formula (IX), $R^2$ stands for a heterocyclic ring system and $R^3$ stands for an alkylene group having 1 to 6 carbon atoms such as 1-(2-hydroxyethyl)-pyrrolidine, 2-(1-pyrrolidyl)ethylamine, 1-(2-hydroxyethyl)-piperidine, 2-(1-piperidyl)-ethylamine, 1-(2-aminopropyl)-piperidine, N-(2-hydroxyethyl)-hexamethyleneimine, 4-(2-hydroxyethyl)-morpholine, 2-(4-morpholinyl)-ethylamine, 4-(3-aminopropyl)-morpholine, 1-(2-hydroxyethyl)piperazine, 1-(2-aminoethyl)-piperazine, 1-(2-hydroxyethyl)-2-alkylimidazolines, 1-(3-aminopropyl)imidazole, (2-aminoethyl)-pyridines, (2-hydroxyethyl)-pyridines, (3-hydroxypropyl)-pyridines, (hydroxymethyl)-pyridines, picolylamines and N-methyl-2-hydroxymethyl-piperidine.

2.4 heterocyclic amines where, in the formula IX, $R^1$ and $R^3$ stand for a direct bond, such as unsubstituted and substituted pyrrolidines, piperidines, hexamethyleneimines, morpholines, imidazolidines, imidazolines, imidazoles, 2-alkylimidazoles and 2-alkylimidazolines.

Preference is given to aromatic amines and heterocyclic amines, in particular hydroxy- or aminoalkyl-heterocylic amines of group 2.3.

3. Addition compounds according to the invention contain a monovalent radical of a polymer of the formula HY. In this formula Y stands for a polymeric radical of the following structure

in which $R^4$, $R^5$, $R^6$ and a have the previously specified meaning.

The compounds of the formula HY can be prepared in various ways. Preference is given to the following methods and groups of compounds:

3.1 addition products of alkylene oxides or aralkylene oxides on monofunctional starters such as alcohols, aromatic hydroxy compounds and secondary amines. Preferred compounds are obtained by addition of ethylene oxide and/or propylene oxide, but to obtain oxyalkylation it is also possible to use other alkylene oxides such as butylene oxide, styrene oxide, tetrahydrofuran and hexamethylene oxide. If several alkylene oxides, for example ethylene oxide and propylene oxide, are added, they can be used in the oxyalkylation either as a mixture or in succession in simple or repeated alternation. Particular preference is given to adducts of ethylene oxide and/or propylene oxide on alcohols, phenols, naphthols, alkylphenols and alkylnaphthols and on dialkylamines having 1 to 30 carbon atoms.

Examples of suitable hydroxyl compounds are: methanol, ethanol, 1-propanol, 2-propanol, 1-butanol, 2-butanol, isobutanol, tert.-butanol, amyl alcohol, 2,2-dimethyl-1-propanol, 3-pentanol, 1-pentanol, 2-pentanol, 2-methyl-1-butanol, 3-methyl-2-butanol, 2-methyl-2-butanol, 3-methyl-1-butanol, 1-hexanol, 2-hexanol, 3-hexanol, 2,3-dimethyl-2-butanol, 2-ethyl-1-butanol, 2-methyl-3-pentanol, 3-methyl-3-pentanol, 4-methyl-1-pentanol, 1-heptanol, 2-heptanol, 3-heptanol, 4-heptanol, 2,2-dimethyl-3-pentanol, 5-methyl-2-hexanol, 2-ethyl-1-hexanol, 1-octanol, 3-octanol, 2-octanol, 2-methyl-4-heptanol, 1-nonanol, 2-nonanol, 5-nonanol, isononanol, 1-decanol, 5-decanol, isodecanols, 1-undecanol, 3-undecanol, 6-undecanol, 1-dodecanol, 2-dodecanol, tridecanol, tetradecyl alcohol, 1-pentadecanol, cetyl alcohol, stearyl alcohol, 1-nonadecanol, 2-nonadecanol, 1-eicosanol, 1-docosanol, methylglycol, ethylglycol, diethylene glycol monobutyl ether, diethylene glycol monoethyl ether, diethylene glycol monomethyl ether, diacetone alcohol, allyl alcohol, 2-methyl-2-propen-1-ol, 2-methyl-3-buten-2-ol, 2-hexenol, 10-undecen-1-ol, 4-methyl-1,6-heptadien-4-ol, cyclohexanol, cyclopentanol, 2-methylcyclohexanol, 3,4-dimethylcyclohexanol, cycloheptanol, propargyl alcohol, 2-methyl-3-butyn-2-ol, 3-methyl-1-pentyn-3-ol, farnesol, geraniol (-)-borneol, linalool, furfuryl alcohol, 2-phenoxyethanol, 1-phenylethanol, 2-phenylethanol, 1-phenyl-1-propanol, triphenylmethanol, 2-phenyl-1-propanol, 3-phenyl-1-propanol, 4-hydroxybiphenyl, 1,1-diphenylethanol, phenol, 3-ethylphenol, 4-ethylphenol, dimethylphenols, 2,6-diisopropylphenol, 2,6-di-tert.-butyl-4-methylphenol, di-tert.-butylphenols, 2-tert.-butyl-4-methoxyphenol, 2-tert.-butyl-4-methylphenol, butylphenols, trimethylphenols, 2,6-dimethoxyphenol, 3,5-dimethoxyphenol, anise alcohol, benzhydrol, benzoin, benzyl alcohol, guajacol, 2-benzylphenol, 4-benzylphenol, thymol, 2-methoxybenzyl alcohol, 2-methylbenzyl alcohol, 3-methylbenzyl alcohol, 4-tert.-butylbenzyl alcohol, cinnamyl alcohol, o-cresol, m-cresol, p-cresol, 1-naphthol, 2-naphthol, hydroquinone monobenzyl ether, hydroquinone monomethyl ether, resorcinol monomethyl ether, N,N-dimethylethanolamine, tributylphenols, hexylphenols, nonylphenols, dodecylphenols, hexadecylphenols, phenylbenzylphenol, phenylethylphenols, toluylethylphenols, dioctylphenols, dinonylphenols, di- and tri-styrylphenols, mono-, di- and tristyrylnaphthols, alcohols of the type preparable from natural fatty acids, such as, for example, lauryl alcohol, coconut alcohol, tallow alcohol and oleyl alcohol, and alcohols from oxo synthesis.

Suitable secondary amines are diallylamine, di-n-butylamine, dicyclohexylamine, didecylamine, dioctylamine, dimethylamine, diethylamine, dipropylamine, dipentylamine, diphenylamine, N-methylaniline, N-ethyl-1-naphthylamine, dibenzylamine and secondary amines of natural products such as distearylamine, dicocamine and ditallowamine.

Particular preference is given to alkyl polyglycol ethers of the following structure:

in which $R^{20}$ stands for an alkyl, phenyl, naphthyl, alkylphenyl or alkylnaphthyl radical having 1 to 30 carbon atoms and e stands for a number from 5 to 80.

The oxyalkylation of the monofunctional starters is effected in a manner known per se.

3.2 addition products of lactones on monofunctional starters such as alcohols, phenol derivatives, mercaptans and amines.

Preferred compounds are obtained by the addition of propiolactone, pivalolactone and in particular ε-caprolactone onto monofunctional alcohols, mercaptans and alkylamines having a boiling point of above 150° C.

Suitable alcohols and phenol derivatives have already been listed in 3.1. Suitable mercaptans are allylmercaptan, 1- and 2-butanethiol, isobutylmercaptan, 1-decanethiol, 1-dodecanethiol, heptylmercaptan, hexanethiol, 1-octadecanethiol, 1-octanethiol, 1-tetradecanethiol, thiophenol, benzylmercaptan and p-thiocresol.

Suitable amines are 2-aminooctane, cyclohexylamine, decylamine, dodecylamine, heptylamine, hexylamine, nonylamine, iso-nonylamine, octadecylamine, octylamine, octadecenylamine, aniline, benzylamine, 1-naphthylamine and primary amines of natural products, such as cocamine, oleylamine, stearylamine and tallowamine having random chain distributions.

The polyaddition is effected in a manner known per se.

If the polyesters are prepared in sealed pressure vessels, it is also possible to use alcohols, mercaptans and amines having low boiling points.

Preferred addition products conform to the following structure:

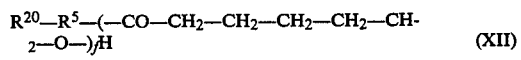

in which
$R^{20}$ and $R^5$ have the previously described meaning and f stands for a number from 4 to 30.

3.3 condensation products of hydroxycarboxylic acids in the presence of corresponding amounts of a monofunctional alcohol or amine.

Preference is given to condensation products of a primary alcohol having 6 to 30 carbon atoms and hydroxycarboxylic acids having 3 to 20 carbon atoms, such as, for example, hydroxypropionic acids, 2-hydroxyisobutyric acid, mandelic acid, DL-tropic acid and in particular hydroxyhexadecanoic acid, 12-hydroxystearic acid, ricinoleic acid and α-hydroxycaproic acid. Primary alcohols are for example 1-, 2- and 3-hexanol, 1-, 2-, 3- and 4-heptanol, 1-, 2- and 3-octanol, 1-, 2- and 5-nonanol, 1- and 5-decanol, iso-decanol, 1-, 3- and 6-undecanol, 1- and 2-dodecanol, iso-tridecanol, tetradecyl alcohol, octadecanol, cetyl alcohol, 1-eicosanol, 1-docosanol and alcohols such as can be obtained from natural products, such as coconut alcohol, stearyl alcohol, tallow alcohol and oleyl alcohol. Suitable primary amines are hexylamine, heptylamine, octylamine, nonylamine, decylamine, dodecylamine, tetradecylamine, hexadecylamine, octadecylamine, octadecenylamine and amines of natural products such as cocamine, stearylamine, oleylamine and tallowamine.

Preferred condensation products conform to the general formula

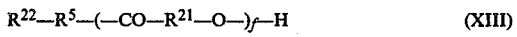

$$R^{22}-R^5-(-CO-R^{21}-O-)_f-H \quad (XIII)$$

in which $R^{22}$ stands for alkyl or alkenyl having 6 to 20 carbon atoms, $R^5$ stands for —O— or —NH—, $R^{21}$ stands for the alkylene radical of hydroxystearic acid, ricinoleic acid or in particular of ε-hydroxycaproic acid and f stands for a number from 4 to 30.

The condensation reaction is effected in known manner in substance or solution.

3.4 condensation products of diols and dicarboxylic acids in the presence of monofunctional alcohols.

Preference is given to condensation products in the presence of primary alcohols having 6 to 30 carbon atoms with dicarboxylic acids having 2 to 40 carbon atoms, such as, for example, adipic acid, succinic acid, malonic acid, oxalic acid, suberic acid, azeleic acid, sebacic acid, phthalic acid, isophthalic acid, phthalic anhydride, tetrahydrophthalic acid, tetrahydrophthalic anhydride, hexahydrophthalic anhydride, endomethylenetetrahydrophthalic anhydride, tetrachlorophthalic anhydride, glutaric acid, glutaric anhydride, maleic acid, maleic anhydride, fumaric acid, dimerized fatty acids and terephthalic acid and its esters, and diols, such as, for example, 1,2-ethanediol, 1,2- and 1,3-propanediol, 1,2-, 2,3- and 1,4-butanediol, 1,6-hexanediol, 1,8-octanediol, 2-methyl-1,3-propanediol, 2,2-dimethyl-1,3-propanediol, 1,4-bis-hydroxymethylcyclohexane and in particular diethylene glycol, triethylene glycol, tetraethylene glycol and higher polyethylene glycols, dipropylene glycol and higher propylene glycols and dibutylene glycol and higher polybutylene glycols. The dicarboxylic acids and diols can be introduced into the reaction separately or in any desired mixture with each other.

The condensation is likewise effected in known manner and the formation of polyester molecules which are esterified at both ends with monoalcohol should be minimized.

3.5 monofunctional polyether-polyester copolymers by combining variants 3.1 to 3.4.

In addition to the copolymers described in 3.4 in which the diol components used are inter alia di-, tri- or poly-glycols, there are further preferred ways of preparing polyether-polyester copolymers, in particular block copolymers, namely by using the addition products of 3.1 as starters for preparing the addition products of 3.2 and the condensation products of 3.3 or, vice versa, by using the reaction products of 3.2 and 3.3 as starters for preparing the addition products of 3.1. Particular attention is drawn to addition products of propiolactone, pivalolactone and in particular ε-caprolactone on alkyl, aryl and aralkyl polyglycol ethers and to the addition products of alkylene oxides, in particular ethylene oxide and propylene oxide, on alkylpolycaprolactones.

Particular preference is given to the compounds described in 3.1 and 3.2.

Preferred addition compounds of the general formula HY have a molecular weight of 400 to 10,000, in particular 600 to 4,000.

4. Addition compounds according to the invention contain a divalent radical of a polymer HZH of the formula XIV

$$\begin{array}{c} -(R^4)_a-R^7 \\ \phantom{-(R^4)_a-}\diagdown \\ \phantom{-(R^4)_a-R^7}R^9 \\ \phantom{-(R^4)_a-}\diagup \\ -(R^4)_b-R^8 \end{array} \quad (XIV)$$

in which $R^4$, $R^7$, $R^9$, a and b have the previously defined meaning.

To prepare preferred compounds of the above formula, it is possible to use the methods described in 3.1 to 3.5, except for the difference that the starters used are bifunctional compounds. Particular mention should be given to:

4.1 addition products of alkylene oxides on starting components having 2 reactive hydrogen atoms such as water, dihydric alcohols, secondary diamines and aromatic dihydroxy compounds.

Examples of suitable diols are: 1,2-ethanediol, 1,2- and 1,3-propanediol, 1,2-, 1,3-, 2,3- and 1,4-butanediol, pentanediols, hexanediols, octanediols, decanediols, di- and tri-ethylene glycol, di- and tri-propylene glycols, cyclohexanediols, 1,4-bis-(hydroxymethyl)-cyclohexane, hydroxylbenzyl alcohols, 2-butene-1,4-diol, 2-butyne-1,4-diol, hydroquinone, pyrocatechol, resorcinol, naphthalenediols, 2,2-dimethyl-1,3-propanediol and 4,4'-dihydroxydiphenylmethane.

The oxyalkylation is effected as described in 3.1.

4.2 addition products of lactones on bifunctional starters such as bifunctional alcohols, hydroxyaromatics, mercaptans and amines.

Suitable diols have already been described in 4.1. Possible dithiols are: 1,2-ethanedithiol, 1,6-hexanedithiol, 1,5-pentanedithiol and 1,3-propanedithiol.

Possible diamines are: 1,2-diaminoethane, 1,2-diaminopropane, 1,4-diaminobutane, hexamethylenediamine, dodecamethylenediamine, 1,2-, 1,3- and 1,4-phenylenediamine.

The polyaddition reaction is subject to the remarks already made in 3.2.

4.3 condensation products of hydroxycarboxylic acids in the presence of corresponding amounts of a bifunctional alcohol or amine.

Preferred condensation products are obtained from the hydroxycarboxylic acids described in 3.3 in the presence of corresponding amounts of alkanediols. Suitable diols are described in 4.1.

4.4 condensation products of diols and dicarboxylic acids with a corresponding excess of diol.

Preference is given to condensation products of the dicarboxylic acids and diols listed in 3.4.

The condensation reaction is effected in the manner described in 3.4 where, in this case, a polyester having an acid number as low as possible is desirable.

4.5 bifunctional polyether-polyester copolymers by combining variants 4.1 to 4.4

In addition to the copolymers preparable by variant 4.4 when the diol components are inter alia di-, tri- or poly-glycols, there are further preferred ways of preparing polyether-polyester copolymers, in particular block copolymers, namely by using the addition products of 4.2 or the condensation products of 4.3 as starters for preparing the addition products of 4.1 or vice versa by using the addition products of 4.1 as starters for preparing the addition products of 4.2 and the condensation products of 4.3.

4.6 addition products of alkylene oxides on primary alkyl- and alkenyl-amines having 6 to 20 carbon atoms. Preference is given to addition products having surface activity as are obtained by addition of ethylene oxide and/or propylene oxide onto fatty amines. Mention should be given to for example the following amines onto which 2 to 100 mol of ethylene oxide and/or propylene oxide are added: hexylamine, octylamine, decylamine, dodecylamine, tetradecylamine, hexadecylamine, octadecylamine, octadecenylamine, eicosylamine, docosylamine and primary amines of natural products such as cocamine, oleylamine, tallowamine and stearylamine.

4.7 addition products of alkylene oxides on alkynediols having 6 to 20 carbon atoms.

Preference is given to addition products having surface activity as are obtained by addition of ethylene oxide and/or propylene oxide onto alkynediols such as, for example, 2,4,7,9-tetramethyl-5-decyne-4,7-diol, 3,6-dimethyl-4-octyne-3,6-diol, 2,5-dimethyl-3-hexyne-2,5-diol and 3-hexyne-2,5-diol.

4.8 surface-active addition products of the formula XV

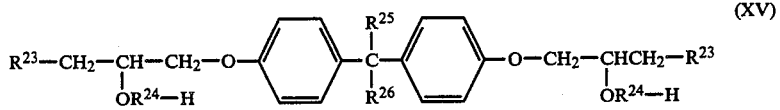
(XV)

where $R^{23}$ is a group of the formulae

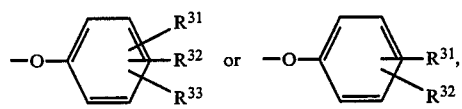

in which $R^{31}$, $R^{32}$ and $R^{33}$ are hydrogen, $C_1$–$C_{18}$-alkyl radicals, chlorine or bromine, $R^{25}$ and $R^{26}$ are hydrogen or $C_1$–$C_4$-alkyl, $R^{24}$ are polyalkylene glycol radicals having about 8 to about 200 alkylene glycol units, $R^{27}$ is a saturated or an ethylenically monounsaturated or polyunsaturated aliphatic radical having 6 to 30 carbon atoms, $R^{28}$ is phenylene or naphthylene, h is 0 or 1, $R^{29}$ and $R^{30}$ are hydrogen or methyl and i is a number from 0 to 25.

Preferred diactive polymers to be used according to the invention are described in 4.1, 4.2 and 4.6 and have a molecular weight of 400 to 10,000, in particular 600 to 4,000.

5. In the preparation of the addition compounds according to the invention, care needs to be taken to ensure that the polyfunctional isocyanates of the formula (VIII) have added onto them three components, namely amino compounds (HX) and polymeric, monofunctional and bifunctional compounds (HY and HZH), which in general differ markedly from one another in reactivity, molecular weight, solubility and their effects on the course of the reaction. It is further necessary to note that in preferred addition compounds all 4 starting compounds are combined in one molecule.

Preferred addition compounds can be prepared in the following ways:

5.1 The polyfunctional isocyanate is reacted in one reaction step with a mixture of components HX, HY and HZH. This simple method of preparation is advisable only when HX, HY and HZH are comparable in their reactivity toward NCO groups and the components are substantially compatible with one another, and it can be carried out by 5.1.1 presenting the polyfunctional isocyanate and adding the mixture of components HX, HY and HZH or preferably by 5.1.2. presenting the mixture HX, HY and HZH and adding the polyfunctional isocyanate.

5.2 The polyfunctional isocyanate is reacted with components HX, HY and HZH in succession in three reaction steps in no particular order. If it is the amine of the formula HX which is reacted first with the polyfunctional isocyanate, the products of the reaction are in many cases sparingly soluble and difficult to process further. In addition, numerous amines speed up not only the formation of urethane but catalyze also secondary reactions of the isocyanates, such as, for example, their polymerization to uretdiones and isocyanurates. For that reason it is preferable 5.2.1 to present the polyfunctional isocyanate and react it first with the monofunctional polymer HY, then with the bifunctional polymer HZH and finally with the amino compound HX. However, it is also possible 5.2.2 to present the polyfunctional isocyanate and to react it first with the bifunctional polymer HZH, then with the monofunctional polymer HY and finally with the amino compound HX.

5.2.3 In a further preferred method of preparation, the first two reaction steps are carried out in accordance with 5.2.1 or 5.2.2. In the 3rd reaction step the amine is presented and the reaction product of polyfunctional isocyanate, HY and HZH is added. This method offers advantages when the amine component has more than one reactive group or causes unwanted secondary reactions of the isocyanate groups.

5.2.4 In a further preferred method of preparation, the first step comprises the reaction of the polyfunctional isocyanate with the monofunctional polymer HY, the second step a reaction with the amino compound HX and the final step the reaction with the bifunctional polymer HZH. Particular preference is given to the variant in which the bifunctional polymer is presented and the reaction product of polyfunctional isocyanate, HY and HX is added. In this method, the stoichiometric ratios can be chosen to be such that predominantly products of the general formula (V) are obtained.

5.3 The polyfunctional isocyanate is reacted in 2 reaction steps with components HX, HY and HZH, the following variants being preferred:

5.3.1 The polyfunctional isocyanate is presented and reacted in the first step with the monofunctional polymer HY and the bifunctional polymer HZH. In the second stage the amine compound HX is added.

5.3.2 The first reaction step is carried out analogously to 5.3.1, but in the 2nd reaction step the reaction product of HY, HZH and the polyfunctional isocyanate is added to the amino compound HX. This method offers the same advantages as 5.2.3.

5.3.3 Particular preference is given to the following procedure in which in the first reaction step the polyfunctional isocyanate is presented and reacted with the monofunctional polymer HY. In the 2nd step this reaction product is added to a mixture of the bifunctional polymer HZH and the amino compound HX. In this method the stoichiometric ratios can be chosen to be such that either predominantly compounds of the formula (V) or of the formulae (VI) and (VII) are obtained.

5.4 The preparation of the addition products according to the invention can be effected in all solvents which are inert towards the reactants or whose reactivity toward the reactants is negligible and in which the reactants and the reaction products are at least partially soluble. Examples are hydrocarbons, in particular aromatic hydrocarbons such as toluene, xylene, ethylbenzenes and tetrahydronaphthalene, chlorinated hydrocarbons, in particular methylene chloride, chloroform, carbon tetrachloride, trichloroethane, trichloroethene and chlorobenzenes, ketones such as butan-2-one, methyl isobutyl ketone, cyclohexanone, ethers such as diisopropyl ether, dibutyl ether, tetrahydrofuran, dioxane and anisole, esters such as methyl acetate, ethyl acetate, butyl acetate, butyl butyrate and butyrolactone, alkylglycol esters such as methylglycol acetate, ethylglycol acetate, butylglycol acetate, ethyldiglycol acetate, butyldiglycol acetate and the corresponding propylene glycol derivatives and 3-methoxy-n-butyl acetate, glycol ethers such as ethylene glycol, diethylene glycol, triethylene glycol and polyalkylene glycol dimethyl ether, acid amides, such as dimethylformamide, dimethylacetamide and N-methylpyrrolid-2-one, nitrogen-containing solvents such as nitrobenzene, nitromethane, acetonitrile and pyridine and sulfur-containing solvents such as dimethyl sulfoxide. The solvents can be used alone or in mixture with one another. To prepare the addition products according to the invention, it is preferable to use solvents which are partially or completely miscible with water.

The reaction for preparing the addition products according to the invention is carried out at a temperature of 0° to 120° C., preferably 20° to 100° C. Preferably the reactants are brought into contact at a temperature of 20° to 60° C. and the reaction is completed at a temperature of 60° to 100° C. The same is true of reactions comprising one, two or three reaction steps.

The solvents can remain in the reaction mixture or are removed by distillation, depending on the boiling point and the field of use. If the reaction product precipitates in the chosen solvent, it can also be isolated by filtration.

The rate of reaction of the polyfunctional isocyanate with the reactants HX, HY and HZH is dependent not only on the nature of the reactants themselves and on the reaction temperature but also on the nature of the solvent used and suitable catalysts. Suitable catalysts are for example compounds of sodium, potassium, magnesium, barium, aluminum, lead, bismuth, tin, zinc, titanium, iron, antimony, uranium, cadmium, cobalt, mercury, nickel, vanadium, cerium, manganese, copper, and also amines such as triethylamine, diethylcyclohexylamine, dimethylethanolamine, N-methyl- and N-ethyl-morpholine, triethylenediamine, N-ethyle-thyleneimine, tetramethylguanidine, 1-methyl-4-(dimethylaminoethyl)piperazine, N,N,N',N'-tetramethyl-1,3-butylenediamine, lauryldimethylamine, tetrakis-(2-hydroxypropyl)ethylenediamine, N,N,N',N'-tetramethylethylenediamine, bis-(2-hydroxypropyl)-2-methylpiperazine, 1,4-diazabicyclo[2.2.2]octane, 1,2,4-trimethylpiperazine, phosphines, carboxylic acids, pyrones and lactams.

Particular preference is given to tertiary amines such as 1,4-diazabicyclo[2.2.2]octane and tin compounds such as dibutyltin dilaurate.

In preferred addition products according to the invention, equivalent of NCO groups of the polyfunctional isocyanate of the formula (VIII) is reacted with 0.1 to 0.8 equivalent, in particular 0.1 to 0.7 equivalent, of OH or NH groups of the amino compounds of the formula HX, with 0.1 to 0.8 equivalent, in particular 0.15 to 0.5 equivalent, of OH groups of the polymers of the formula HY and 0.02 to 0.5 equivalent, in particular 0.05 to 0.3 equivalent, of OH groups of the polymers of the formula HZH.

To prepare the addition compounds according to the invention conforming to the formula (VI) and (VII), the polyfunctional isocyanates are reacted exactly in the stoichiometric ratio with the amino compounds of the formula HX and the hydroxyl-containing polymers of the formulae HY and HZH.

The addition compounds according to the invention conforming to the formula (V) are preferably prepared by methods 5.2.4 and in particular 5.3.3. by choosing the stoichiometric ratios in such a way that essentially only one OH group of the polymer HZH reacts with NCO groups.

The stoichiometric ratios can also be chosen to be such that the polymer HZH can react partly with one OH group and partly with 2 OH groups, so that a mixture of addition products of the formulae (V) to (VII) is formed.

If amino compounds HX having more than one reactive group per molecule are used, these compounds can react one or more times with isocyanate groups, depending on the management of the reaction and on the stoichiometric ratios. Preference is given to amino compounds which can be attached to the polyisocyanate units via only one bond.

If the addition reaction is carried out in 2 or 3 steps, it is advisable, in addition to determining the NCO content before the reaction, to determine the NCO content after each reaction step. This can be effected by IR spectrometry, through evaluation of the NCO bands or by titration analysis. The titrimetric determination is carried out by diluting an accurately weighed sample with chlorobenzene and adding an excess of a standardized dibutylamine solution in chlorobenzene. After at most 5 minutes the excess amine solution can after addition of methanol be backtitrated with standardized alcoholic hydrochloric acid against bromophenol blue as indicator. In case of secondary reactions which lead to an increased conversion of NCO groups, a correction is possible in the further reaction steps.

Observed secondary reactions are caused in the main by a number of amine derivatives and by alkali metal salts. These alkali metal salts are present in most polymeric addition products based on alkylene oxides. The secondary reactions can be desirable or tolerable up to a certain degree. However, if they get out of control, they lead to gellike, sparingly soluble, high-molecular addition products which are unsuitable for further use. To avoid these secondary reactions, purification of the polyalkylene oxides is advisable.

This was done by means of suitable adsorbents or ion exchangers or for example by adding to the crude polyether, at elevated temperature with stirring, water and then 85% strength by weight aqueous (sirupy) phosphoric acid. The reaction mixture was stirred at the temperature for an hour and had added to it a commercially available synthetic magnesium silicate. After a further hour of stirring a filter aid based on kieselguhr was added, followed at the same temperature by pressure filtration through a metal filter and removal of the water by distillation under reduced pressure.

Particular preference is given to addition products according to the invention which are emulsifiable or at least partially soluble in water, so that they can be applied in aqueous phase to solids, in particular pigments, and have a dispersing and stabilizing effect on solids even in aqueous systems. By applying the addition products and if desired further, customary surface-active substances to the solids, in particular pigments, it is possible to prepare low-dust, easily dispersible microgranulates. The addition products according to the invention are naturally suitable for dispersing solids, in particular pigments, in organic media.

Suitable inorganic pigments are for example white and colored pigments such as titanium oxides, zinc oxides, zinc sulfides, cadmium sulfides or selenides, iron oxides, chromium oxides, chromate pigments, such mixed oxides of the elements aluminum, antimony, chromium, iron, cobalt, copper, nickel, titanium and zinc as are suitable for use as pigments, and also extended pigments and in particular carbon blacks.

Suitable organic pigments are for example: azo pigments, azamethines, azaporphines, quinacridones, flavanthrone, anthanthrone and pyranthrone structures, derivatives of naphthalenetetracarboxylic acid, of perylenetetracarboxylic acid, of thioindigo, of dioxazine and of tetrachloroisoindolinone, laked pigments such as magnesium, calcium, strontium, barium, aluminum, manganese, cobalt and nickel salts of dyes which contain acid groups, and corresponding pigment mixtures.

There are a number of ways of applying the addition compounds according to the invention to the surface of a solid. This process can take place during or after the synthesis of pigments, in the course of finishing or in the course of their further processing in the application medium. It is particularly preferred to apply the assistants in aqueous suspensions after the pigment synthesis, since in this way the optimal effect is obtained with the lowest concentration of the addition compounds according to the invention.

Pigments can be used in the form obtained in synthesis or together with further customary solvents and assistants, in particular acids and surface-active substances.

The pigment dispersions obtained by dispersing pigments in organic liquids in the presence of the addition compounds according to the invention are suitable for coloring 2-component and baking finishes.

The addition compounds according to the invention are highly compatible with a very wide range of binder systems. Dispersions whose pigments have been stabilized by the addition compounds according to the invention are distinguished by good rheological properties combined with a high degree of pigmentation, high flocculation resistance, high tinctorial strength and high gloss.

For the addition compounds according to the invention to develop their optimal activity, they are applied to the pigment in a concentration of 0.3 mg to 100 mg, preferably 1 mg to 10 mg, based on 1 $m^2$ of BET pigment surface area.

The addition products described in the examples below are tested for suitability either by applying them to pigments or by using them to disperse solids, in particular pigments, in organic liquids or in paint systems. The paint systems selected from the large number of known systems were an alkyd/melamine resin paint (AM) based on a medium-oil, non-drying alkyd resin of synthetic fatty acids and phthalic anhydride and on a butanol-etherified melamine resin and also an acrylic resin baking finish based on a non-aqueous dispersion (TSA-NAD). The bake coatings obtained with these finishes were used to measure the application properties, in particular gloss. The gloss was measured at an angle of 20° in accordance with DIN 67530 (ASTM D 523) using the "multigloss" glossmeter from Byk-Mallinckrodt. In addition, after dispersal in the emulsion paint it was possible to assess the viscosity of the system using a viscometric dipstick. In almost all cases use of the addition compounds according to the invention led to a marked reduction in the viscosity of the pigmented paints.

In the examples below parts are by weight. The addition products according to the invention were preferably prepared in solvents which were free of OH- and NH-containing impurities and in the absence of humidity. The molecular weight was determined osmometrically in dimethyl sulfoxide.

EXAMPLE 1

In a stirred vessel, 7.5 parts of 4,4'-diphenylmethane diisocyanate polymers having the idealized structure of the formula VIII (viscosity at 25° C. 130 mPas) were dissolved in 20 parts of diglycol dimethyl ether. 0.03 part of dibutyltin dilaurate was added, and the mixture was heated to 40° C. To this solution, which had an NCO content of 8.6%, were rapidly added dropwise 3 parts of polyethylene glycol (mean molecular weight 600) in 20 parts of diglycol dimethyl ether, and the batch was stirred at 70° C. for 90 minutes and an NCO content of 4.0% was found. After cooling down the content of the vessel to 40° C., 20 parts of a polyglycol monomethyl ether (mean molecular weight 1,000, ethylene oxide/propylene oxide ratio 4:1) in 10 parts of diglycol dimethyl ether were rapidly added. The mixture was stirred at 70° C. for 1 hour, and an NCO content of 1.5% was found. 2.7 parts of N,N-dimethylethanolamine in 10 parts diglycol dimethyl ether were then added dropwise at 40° C. in the course of 10 minutes. The mixture was stirred at 70° C. for 2 hours to give a slightly brownish, clear, low-viscosity product which had a solids content of 35.6% and no longer featured NCO groups in the IR spectrum. Mean molecular weight of the solid: 3700.

APPLICATION EXAMPLE 1

In a stirred vessel, 16 parts of the solution of the addition product of Example 1 were diluted with 0.4 part of acetic acid and 280 parts of $H_2O$. To this clear solution were added while stirring with a dissolver 376 parts of a press cake of the hiding γ-modification of C.I. Pigment Violet 19 (solids content 25%; BET surface area 34 $m^2/g$) a little at a time, which was followed by stirring for 20 minutes and subsequent drying of the resulting pigment suspension. If this pigment thus obtained was dispersed in a concentration of 7% in the AM paint described, the high-gloss coatings prepared therewith were found to have gloss values of 90.

If the 16 parts of the solution of the addition product of Example 1 were replaced by a 35.6% strength solution of the polyester of Examples 1 and 2 of U.S. Pat. No. 3,970,687 in diglycol dimethyl ether, the AM coatings obtained were very specky and unsuitable for measuring consistent gloss values. If the 16 parts of the addition product of Example 1 were replaced by 16 parts of $H_2O$, a paint of significantly higher viscosity was obtained. Correspondingly pigmented AM coatings, which had a matt appearance with a milky haze, were found to have gloss values of 28.

EXAMPLE 2

7.5 parts of a 4,4'-diphenylmethane diisocyanate polymer having the idealized structure of the formula VIII (viscosity at 25° C. 130 mPas), 30 parts of xylene and 0.03 part of 1,4-diazabicyclo[2.2.2]octane were presented in a stirred vessel and heated to 60° C. To this solution having an NCO content of 6.2% were added dropwise in the course of 20 minutes 36 parts of a polyester from 1 mol of decanol and 25 mol of ε-caprolactone, dissolved in 40 parts of methylglycol acetate, the mixture was stirred at 90° C. for 1 hour and an NCO content of 1.7% was found. The batch was cooled down to 60° C., and 2.7 parts of an adduct of 10 mol of ethylene oxide on 1 mol of 2,4,7,9-tetramethyl-5-decyne-4,7-diol in 10 parts of methylglycol acetate were rapidly added. The mixture was stirred at 90° C. for 1 hour and an NCO content of 1.2% was found. In a second reaction vessel, 13.4 parts of 2-[2-(8-heptadecene1-yl)-4,5-dihydro-1-imidazolyl]-ethanol and 10 parts of methylglycol acetate were presented and heated to 60° C. In the course of 30 minutes, the reaction product of the first and second reaction stage was added dropwise, and the batch was stirred at 90° C. for a further 2 hours. The result obtained was an NCO-free, yellowish, clear, low-viscosity product having a solids content of 39.8%. Mean molecular weight of the solid: 4200.

APPLICATION EXAMPLE 2

7% of C.I. Pigment Violet 19 of the hiding γ-modification (BET surface area 34 $m^2/g$) were dispersed in the AM paint described with addition of the solution of the addition product of Example 2 (0.7% of 100% pure addition product), and the coatings prepared therewith were baked. The high-gloss coatings were found to have gloss values of 88. If the 0.7% of the addition product of Example 2 was replaced by solvent, the results obtained were paints having significantly higher viscosity and matt coatings having a milky haze and gloss values of 27.

If the 0.7% of the addition product of Example 2 was replaced by 0.7% of the polyester of Examples 1 and 2 of U.S. Pat. No. 3,970,687, the results obtained were matt coatings having a gloss value of 42.

EXAMPLE 3

23.3 parts of an adduct of 1 mol of nonylphenol and 30 mol of ethylene oxide, 11 parts of a block copolymer comprising 80% by weight of propylene oxide and 20% by weight of ethylene oxide (mean molecular weight 2200), 4.5 parts of N-methyl-2-hydroxymethylpiperidine, 0.04 part of dibutyltin dilaurate and 50 parts of methylglycol acetate were presented in a stirred vessel and heated to 50° C. 7.5 parts of a 4,4'-diphenylmethane diisocyanate polymer having the idealized structure of formula VIII (viscosity at 25° C. 130 mPas), dissolved in 30 parts of N-methylpyrrolidone, were added dropwise in the course of 15 minutes, and the batch was stirred at 80° C. for a further 2 hours. This gave a slightly brownish, clear, low-viscosity solution of the reaction product having a solids content of 36.7%. No NCO groups were any longer detectable in the IR spectrum. Mean molecular weight of the solid: 4100.

APPLICATION EXAMPLE 3

In a stirred vessel, 800 parts of a press cake of the hiding γ-modification of C.I. Pigment Violet 19 (solids content 25%; BET surface area 34 $m^2/g$) were added to a mixture of 32 parts of the addition product described in Example 3, 4 parts of an adduct of nonylphenol and 8 mol of ethylene oxide and 80 parts of water, and the mixture was stirred with a dissolver for 20 minutes. The resulting fluent pigment suspension was then spray-dried. This gave a low-dust microgranulate. If the microgranulate obtained was used to prepare an alkyd/melamine resin paint obtained as per Application Example 2 without further addition of the addition product of Example 3, the results obtained were high-gloss coatings having gloss values of 86.

EXAMPLE 4

In a stirred vessel, 7.5 parts of a 4,4'-diphenylmethane diisocyanate polymer having the idealized structure of formula VIII (viscosity at 25° C. 250 mPas) and 0.03 part of dibutyltin dilaurate were dissolved in 20 parts of methylglycol acetate, and the solution was heated to 50° C. To this solution were added dropwise in the course of 10 minutes 19.1 parts of a polyester of 1 mol of decanol and 7 mol of ε-caprolactone in 30 parts of methylglycol acetate, and the batch was stirred at 80° C. for a further 2 hours, during which the NCO content dropped from 3.3% at the start of the reaction to 2.25%. 8 parts of a polyethylene glycol (mean molecular weight of 1000) and 3.75 parts of N-(3-aminopropyl)-imidazole were presented in 40 parts of N-methylpyrrolidone in a second reaction vessel, and heated to 50° C. To this solution was added in the course of 30 minutes the clear, slightly yellowish, low-viscosity reaction product of the first reaction stage, the batch was stirred at 80° C. for a further 2 hours, affording at room temperature a yellowish, clear, low-viscosity end product having a solids content of 30% and no longer any detectable NCO groups. Mean molecular weight of the solid: 3800.

APPLICATION EXAMPLE 4

37 parts of C.I. Pigment Violet 19, 16 parts of the solution of the addition product of Example 4 and 47 parts of methylglycol acetate were dispersed in a bead mill for 1 hour using 1 mm siliquartzite beads, giving a stable pigment dispersion which is suitable in particular for pigmenting the paint systems described. The coatings pigmented therewith were found to have gloss values of 87. If this pigment dispersion was dried, the result obtained was a readily dispersible, low-dust pigment.

EXAMPLE 5

In a stirred vessel, 7.5 parts of a 4,4'-diphenylmethane diisocyanate polymer having the idealized structure of the formula VIII (viscosity at 25° C. 300 mPas) and 0.03 part of dibutyltin dilaurate were dissolved in 20 parts of methylglycol acetate, and the solution was heated to 50° C. To this solution were added dropwise in the course of 15 minutes 20 parts of a polyglycol monomethyl ether (mean molecular weight 1000, ethylene oxide/propylene oxide ratio 4:1) in 30 parts of methylglycol acetate, and the batch was stirred at 80° C. for a further 2 hours, during which the NCO content dropped from 3.2% at the start of the reaction to 2.1%. In a second reaction vessel, 10 parts of an adduct of 1 mol of ethylene glycol and 17 mol of ε-caprolactone and 3.75 parts of N-(3-aminopropyl)-imidazole were presented in 30 parts of methylglycol acetate and heated to 50° C. To this solution was added in the course of 30 minutes the clear, yellow, low-viscosity reaction product of the first reaction stage, and the batch was stirred at 80° C. for a further 2 hours, affording an end product which at room temperature has a yellowish color, is of sodium viscosity and turbid and has a solids content of 34% and in which NCO groups were no longer detectable. Mean molecular weight of the solid: 4400.

If this reaction product was used in accordance with Application Example 4, the result obtained was a stable pigment dispersion. The AM paint coats pigmented therewith were found to have gloss values of 85.

If the adduct of 1 mol of ethylene glycol and 17 mol of ε-caprolactone was replaced by a polyethylene glycol (mean molecular weight 1000) and/or N-(3-aminopropyl)-imidazole was replaced by 4-(3-aminopropyl)-morpholine, AM paint films having comparable gloss values were obtained.

APPLICATION EXAMPLE 5

30 parts of the addition compound of Example 4 (30% strength solution in N-methylpyrrolidone/methylglycol acetate) were presented in a stirred vessel. To this solution were added with stirring 70 parts of a finely ground dolomite. The resulting dispersion was dispersed in a bead mill using siliquartzite beads of 1 mm in diameter. This gave a very fluent, homogeneous, storable and antiflocculant dispersion having a solids content of 70%. If the addition compound used was replaced by N-methylpyrrolidone/methylglycol acetate 1:1.25, the result obtained was a pasty dispersion which had a solids content of at most 60% and in which there appeared marked formation of serum after a very short time.

EXAMPLE 6

In a stirred vessel, 7.5 parts of a 4,4'-diphenylmethane diisocyanate polymer having the idealized structure of the formula VIII (viscosity at 25° C. 250 mPas) were dissolved in 20 parts of diglycol dimethyl ether, 0.03 part of dibutyltin dilaurate was added and the mixture was heated to 50° C. 17.6 parts of an adduct of 1 mol of nonylphenol and 15 mol of ethylene oxide in 30 parts of diglycol dimethyl ether were added dropwise in the course of 15 minutes, and the reaction mixture was stirred at 80° C. for 2 hours, during which the NCO content dropped from 3.1% at the start of the reaction to 2.1%. The batch was cooled down to 50° C., and 20 parts of an oxyethylated reaction product from the bisglycidyl ether of 2,2-bis(4-hydroxyphenyl)-propane and an etheramine of the general formula [$R^a$(OCH$_2$—CH$_2$)$_5$]$_2$NH, in which $R^a$ represents the alkyl radical of coconut alcohol (mean molecular weight of the reaction product 4000), dissolved in 20 parts of diglycol dimethyl ether, were added dropwise in the course of 20 minutes. After a reaction time of 1 hour at 80° C. the NCO content was found to be 1.0%. 3.9 parts of 1-(2-hydroxyethyl)-piperazine dissolved in 20 parts of diglycol dimethyl ether, were then added dropwise at 50° C. in the course of 10 minutes, and the content of the reaction vessel was stirred at 80° C. for 2 hours, affording a brownish, clear, low-viscosity product having a solids content of 35.2% and no longer any detectable NCO groups in the IR spectrum. Mean molecular weight of the solid: 6700. If this addition product was applied to C.I. Pigment Violet 19 in accordance with Application Example 1, a TSA-NAD paint pigmented therewith was found to have gloss values of 90. The comparative experiment without the addition product led to gloss values of 58.

EXAMPLE 7

In a stirred vessel, 7.5 parts of 4,4'-diphenylmethane diisocyanate polymer having the idealized structure of the formula VIII (viscosity at 25° C. 400 mPas) and 0.03 part of dibutyltin dilaurate were dissolved in 20 parts of methylglycol acetate, and this solution was heated to 50° C. To this solution were added dropwise in the course of 10 minutes 21.6 parts of a fatty alcohol polyglycol ether (approximate mean chain distribution of the coconut alkyl radical C$_8$ 6%, C$_{10}$ 6%, C$_{12}$ 54%, C$_{14}$ 18%, C$_{16}$ 8%, C$_{18}$ 8%; mean molecular weight 1080) in 30 parts of methylglycol acetate, and the batch was stirred at 80° C. for a further 2 hours, during which the NCO content dropped from 3.2% at the start of the reaction to 2.1%. In a further reaction vessel, 10.9 parts of an adduct of stearylamine and 25 mol of ethylene oxide (approximate mean chain distribution for the stearyl radical C$_{14}$ 5%, C$_{16}$ 30%, C$_{18}$ 65%) and 2.5 parts of 3-amino-1,2,4-triazole were presented in 30 parts of methylglycol acetate and heated to 50° C. To this solution was added in the course of 30 minutes the clear, yellowish, low-viscosity reaction product of the first reaction stage, and the batch was stirred at 80° C. for a further 2 hours, affording an end product which at room temperature was slightly pale brown, clear and of low viscosity and had a solids content of 34.7% and in which NCO groups were no longer detectable. Mean molecular weight of the solid: 4300. If this addition product was applied to C.I. Pigment Violet 19 in accordance with Application Example 3, TSA-NAD paint coats pigmented therewith were found to have gloss values of 80.

EXAMPLE 8

In a stirred vessel, 7.5 parts of a 4,4'-diphenylmethane diisocyanate polymer having the idealized structure of the formula VIII (viscosity at 25° C. 250 mPas) were dissolved in 20 parts of methylglycol acetate, 0.04 part of 1,4-diazabicyclo[2.2.2]octane was added, and the mixture was heated to 50° C. 22.4 parts of an ethoxylated and propoxylated linear fatty alcohol (OH number 50) in 30 parts of methylglycol acetate were added dropwise in the course of 15 minutes, and the mixture was stirred at 80° C. for 2 hours, during which the NCO content fell from 2.9% at the start of the reaction to 2.0% after the reaction. In a second reaction vessel, 10 parts of a polyethylene glycol (mean molecular weight 2000), 3.5 parts of 1-(2-hydroxyethyl)-pyrrolidine and 30 parts of N-methylpyrrolidone were presented and heated to 50° C. The reaction product of the first reaction stage was then added dropwise in the course 30 minutes, and the batch was stirred at 80° C. for 2 hours, affording a slightly brownish, somewhat turbid, low-viscosity product having a solids content of 35.2%. No NCO groups were any longer detectable in the IR spectrum. Mean molecular weight of the solid: 3900. If this addition product was applied to C.I. Pigment Violet 19 in accordance with Application Example 3, the AM paint coats pigmented therewith were found to have gloss values of 89.

EXAMPLE 9

In a stirred vessel, 7.5 parts of a 4,4'-diphenylmethane diisocyanate polymer having the idealized structure of the formula VIII (viscosity at 25° C. 250 mPas), 20 parts of methylglycol acetate and 0.5 part of dibutyltin dilaurate were presented and heated to 60° C. To this solution having an NCO content of 8.5% were added dropwise at first 23.7 parts of a fatty alcohol polyglycol ether based on an unsaturated $C_{16}$–$C_{18}$ alcohol (mean molecular weight 1184) in 30 parts of methylglycol acetate and then 8 parts of a polyethylene glycol (mean molecular weight 1000) in 20 parts of methylglycol acetate in the course of 30 minutes. The batch was stirred at 100° C. for 1 hour, and the NCO content was found to be 1.0%. In a second reaction vessel, 4.8 parts of N-methyl-(2-hydroxymethyl)-piperidine were presented in 10 parts of methylglycol acetate and heated to 60° C. To this solution was added dropwise the reaction product of the first reaction stage in the course of 30 minutes, and the mixture was stirred at 100° C. for a further 1.5 hours. This gave a brownish, clear, low-viscosity product having a solids content of 35.5%. No NCO groups were any longer detectable in the IR spectrum. Mean molecular weight of the solid: 4700. If this addition product was applied to C.I. Pigment Violet 19 in accordance with Application Example 1, the AM paint coats pigmented therewith were found to have gloss values of 86.

EXAMPLE 10

In a stirred vessel, 7.5 parts of a 4,4'-diphenylmethane diisocyanate polymer having the idealized structure of the formula VIII (viscosity at 25° C. 250 mPas) were presented in 20 parts of butyl acetate, 0.04 part of dibutyltin dilaurate was added, and the temperature was raised to 40° C. To this solution having an NCO content of 8.5% were added dropwise in the course of 15 minutes 24 parts of a polyglycol monobutyl ether (mean molecular weight 1200, ethylene oxide/propylene oxide ratio 1:1) dissolved in 30 parts of butyl acetate. This was followed by 2 hours of stirring at 70° C., after which the NCO content was found to be 1.9%. In a second reaction vessel, 7.2 parts of a polyester of 6 mol of hexane-1,6-diol and 5 mol of adipic acid (mean molecular weight 1445) and 3.4 parts of 2-(1-pyrrolidyl)-ethylamine were presented in 30 parts of butyl acetate and heated to 40° C. The reaction product of the first reaction was added dropwise in the course of 30 minutes, the batch was stirred at 70° C. for 2 hours, affording a yellowish, clear, high-viscosity product having a solids content of 34.5%. No NCO groups were any longer detectable in the IR spectrum. Mean molecular weight of the solid: 5400. If this addition product was added to the AM paint in accordance with Application Example 2, high-gloss coatings having gloss values of 86 were obtained.

EXAMPLE 11

In a reaction vessel, 7.5 parts of a 4,4'-diphenylmethane diisocyanate polymer having the idealized structure of the formula VIII (viscosity at 25° C. 250 mPas) were dissolved in 10 parts of methylglycol acetate, and after addition of 0.03 part of 1,4-diazabicyclo[2.2.2]octane the solution was heated to 50° C. To this solution were rapidly added 20 parts of a polyglycol monomethyl ether (mean molecular weight 1000, ethylene oxide/propylene oxide ratio 4:1) in 20 parts of methylglycol acetate, and the mixture was stirred at 80° C. for 2 hours. This gave a slightly brownish, clear, low-viscosity solution having an NCO content of 2.7%. In a second reaction vessel, 16 parts of an adduct of 1 mol of ethylene glycol and 17 mol of ε-caprolactone (mean molecular weight 2000), 5 parts of 2-methoxy-4-nitroaniline and 50 parts of methylglycol acetate were presented and heated to 50° C. To this solution was added dropwise in the course Of 15 minutes the reaction product of the first reaction stage, and the batch was then stirred at 80° C. for 2 hours. This gave a brownish, low-viscosity, clear product having a solids content of 37.8%. No NCO groups were any longer detectable in the IR spectrum. Mean molecular weight of the solid: 4200. If the reaction product was applied to C.I. Pigment Violet 19 in accordance with Application Example 1, an AM paint pigmented therewith was found to have gloss values of 83.

EXAMPLE 12

In a stirred vessel, 29.8 parts of a polyester of 1 mol of decanol and 16 mol of ε-caprolactone, 10 parts of a polyethylene glycol (mean molecular weight 2000), 4.6 parts of 4-(2-hydroxyethyl)-morpholine, 25 parts of xylene, 25 parts of dimethyl sulfoxide and 0.04 part of 1,4-diazabicyclo[2.2.2]octane were presented and heated to 60° C. To this solution were added dropwise in the course of 15 minutes 7.5 parts of a 4,4'-diphenylmethane diisocyanate polymer having the idealized structure of the formula VIII, dissolved in 30 parts of butyl acetate, and the mixture was stirred at 90° C. for 2 hours. This gave a brownish, low-viscosity, clear product having a solids content of 39.3% and no longer any NCO bands in the IR spectrum. Mean molecular weight of the solid 4800. If this addition product was added to the AM paint in accordance with Application Example 2, high-gloss coatings having gloss values of 85 were obtained.

EXAMPLE 13

In a stirred vessel, 7.5 parts of a 4,4'-diphenylmethane diisocyanate polymer having the idealized structure of the formula VIII (viscosity at 25° C. 250 mPas) were dissolved in 10 parts of diglycol dimethyl ether, 0.04 part of dibutyltin dilaurate was added, and the temperature was raised to 60° C. To this solution having an NCO content of 13.3% was added dropwise in the course of 10 minutes a mixture of 7.8 parts of an adduct of 1 mol of polyethylene glycol (mean molecular weight 600) and 6 mol of ε-caprolactone, 14 parts of an ethoxylated and propoxylated linear fatty alcohol (mean molecular weight 930), 20 parts of N-methylpyrrolidone and 10 parts of diglycol dimethyl ether. After a reaction time of 2 hours at 100° C. the NCO content was 1.8%. 4.4 parts of 2-aminobenzimidazole were then dissolved in 30 parts of diglycol dimethyl ether and 10 parts of N-methylpyrrolidone, and the mixture was added dropwise at 60° C. in the course of 20 minutes. Owing to a marked increase in viscosity, a further 80 parts of diglycol dimethyl ether were added during the dropwise addition. The mixture was stirred at 100° C. for 2 hours, affording a brownish, turbid, low-viscosity product having a solids content of 17.2%. No NCO groups were any longer detectable in the IR spectrum. Mean molecular weight of the solid: 5500. If the addition product was added to the AM paint in accordance with Application Example 2, high-gloss coatings having gloss values of 87 were obtained.

EXAMPLE 14

In a stirred vessel, 7.5 parts of a 4,4'-diphenylmethane diisocyanate polymer having the idealized structure of the formula VIII (viscosity at 25° C. 130 mPas) were dissolved in 10 parts of methylglycol acetate, 0.04 part of dibutyltin dilaurate was added, and the temperature was raised to 50° C. To this solution having an NCO content of 13.0% was added dropwise in the course of 15 minutes a mixture of 23.9 parts of a polyester of 1 mol of decanol and 7 mol of ε-caprolactone, 17.6 parts of a block copolymer of 60% by weight of propylene oxide and 40% by weight of ethylene oxide (mean molecular weight 2930) and 30 parts of methylglycol acetate. The batch was stirred at 80° C. for 2 hours and was found to have an NCO content of 0.9%. In a second reaction vessel, 2.1 parts of diethylenetriamine were dissolved in 20 parts of methylglycol acetate, and the temperature was raised to 50° C. To this solution was added dropwise in the course of 30 minutes the reaction product of the first reaction stage and a further 30 parts of methylglycol acetate, and the reaction mixture was stirred at 80° C. for 2 hours. This gave a yellowish, clear, highly fluent product having a solids content of 36.2%. No NCO groups were any longer detectable in the IR spectrum. Mean molecular weight of the solid: 4400. If the addition product was used in accordance with Application Example 4, a stable pigment dispersion was obtained. TSA-NAD paint coats pigmented therewith were found to have gloss values of 88.

EXAMPLE 15

In a stirred vessel, 7.5 parts of a 4,4'-diphenylmethane diisocyanate polymer having the idealized structure of the formula VIII (viscosity at 25° C. 200 mPas) were dissolved in 10 parts of methylglycol acetate, 0.03 part of 1,4-diazabicyclo[2.2.2]octane was added and the temperature was raised to 50° C. To this solution having an NCO content of 13.7% was added dropwise in the course of 20 minutes a mixture of 9.7 parts of an adduct of nonylphenol and 8 mol of ethylene oxide, 21.2 parts of an ethoxylated reaction product of the bisglycidyl ether of 2,2-bis(4-hydroxyphenyl)propane and triisobutylphenol (mean molecular weight 5300), 4.4 parts of N-(3-aminopropyl)imidazole and 40 parts of methylglycol acetate. The batch was stirred at 80° C. for 2 hours, affording a slightly yellow, turbid, fluent product having a solids content of 46.1%. No NCO groups were any longer detectable in the IR spectrum. Mean molecular weight of the solid: 6200. If the reaction product was added to the AM paint in accordance with Application Example 2, high-gloss coatings having gloss values of 86 were obtained.

EXAMPLE 16

In a stirred vessel, 7.5 parts of a 4,4'-diphenylmethane diisocyanate polymer having the idealized structure of the formula VIII (viscosity at 25° C. 400 mPas) were presented in 10 parts of diglycol dimethyl ether, 0.03 part of 1,4-diazabicyclo[2.2.2]octane was added, and the temperature was raised to 60° C. To this solution having an NCO content of 13.3% were added dropwise in the course of 15 minutes 10.6 parts of an adduct of 1 mol of nonylphenol and 15 mol of ethylene oxide in 30 parts of diglycol dimethyl ether. The mixture was stirred at 100° C. for 2 hours and was found to have an NCO content of 3.2%. In a second reaction vessel, 9.6 parts of an adduct of 1 mol of oleylamine and 12 mol of ethylene oxide (approximate mean chain distribution for the oleyl radical $C_{12}$ 1%, $C_{14}$ 4%, $C_{16}$ 12%, $C_{18}$ 83%), 3.1 parts of N-(3-aminopropyl)-imidazole and 30 parts of cyclohexanone were presented and heated to 60° C. To this solution was added dropwise in the course of 20 minutes the reaction product of the first reaction stage, and the batch was stirred at 100° C. for a further 2 hours, giving a brownish, slightly turbid, low-viscosity product having a solids content of 30.6%. No NCO groups were any longer detectable in the IR spectrum. Mean molecular weight of the solid: 3800. If the addition product of Example 16 was added to the AM paint in accordance with Application Example 2, high-gloss coatings having gloss values of 85 were obtained. Replacing N-(3-aminopropyl)-imidazole by 3-amino-1,2,4-triazole gave products having comparable properties.

EXAMPLE 17

In a stirred vessel, 7.5 parts of a 4,4'-diphenylmethane diisocyanate polymer having the idealized structure of the formula VIII (viscosity at 25° C. 400 mPas) were dissolved in 20 parts of methyl ethyl ketone, 0.04 part dibutyltin dilaurate was added, and the temperature was raised to 50° C. To this solution having an NCO content of 8.5% was added dropwise in the course of 30 minutes a mixture of 19.3 parts of a fatty alcohol polyglycol ether (approximate mean chain distribution for the fatty alkyl radical $C_8$ 6%, $C_{10}$ 6%, $C_{12}$ 54%, $C_{14}$ 18%, $C_{16}$ 8%, $C_{18}$ 8%; mean molecular weight 1000) and 50 parts of diglycol dimethyl ether. The mixture was stirred at 80° C. for 2 hours and was found to have an NCO content of 0.9%. In a second reaction vessel, 3.1 parts of N-(3-aminopropyl)-imidazole were dissolved in 30 parts of diglycol dimethyl ether, and the temperature was raised to 50° C. To this solution was added dropwise in the course of 30 minutes the reaction product of the first reaction stage, and the batch was stirred at 80° C. for a further 1.5 hours. This gave a clear, yellowish, low-viscosity product having a solids content of 25.3%. No NCO groups were any longer detectable in the IR spectrum. Mean molecular weight of the solid: 3500. If the addition product was added to the AM paint in accordance with Application Example 2, high-gloss coatings having gloss values of 88 were obtained. If N-(3-aminopropyl)-imidazole was replaced by imidazole, products having somewhat less favorable properties were obtained.

APPLICATION EXAMPLE 6

87 parts of a 34.5% strength aqueous press cake of C.I. Pigment Red 188 were suspended in 273 parts of water, and to the resulting pigment suspension was added a solution of 4.7 parts of the solution of the addition product of Example 7 in 120.6 parts of chlorobenzene. The pigment suspension was heated to 90° C. with thorough stirring and was maintained at that temperature for 1 hour. The organic solvents were then removed by steam distillation. The resulting aqueous pigment suspension was filtered, and the filter cake was dried and subsequently ground. If 10% of the pigment thus treated was dispersed in the AM paint described and the coatings obtained therewith were baked at 130° C., they were found to have a gloss value of 83. If in the abovementioned thermal treatment of the azo pigment the 4.7 parts of the addition product of Example 7 were replaced by chlorobenzene, coatings having a gloss value of 65 were obtained.

APPLICATION EXAMPLE 7

180 parts of a 27.8% strength press cake of C.I. Pigment Orange 36 were suspended in 260 parts of water, and after addition of 180 parts of o-dichlorobenzene the suspension was heated in a sealed vessel with stirring to 130°–135° C. and was maintained at that temperature for 1 hour. After cooling down to 85° C. the suspension had added to it 4 parts of the solution of the addition product of Example 7, dissolved in 25 parts of o-dichlorobenzene, and the organic solvents were subsequently removed by distillation by passing in steam. The pigment filtered off from the aqueous suspension was dried, ground and incorporated in the TSA-NAD paint in 10% concentration, where it brought about a distinctly lower viscosity of the paint than the pigment obtained in the comparative experiment without addition of the addition product of Example 7.

APPLICATION EXAMPLE 8

650 parts of a pigment suspension comprising 28 parts of the hiding γ-modification of C.I. Pigment Violet 19, 130 parts of isobutanol and 492 parts of water, as obtained after finishing, were heated with stirring to 50° C. At that temperature 7.5 parts of the 29.9% strength solution of the addition product of Example 4, dissolved in 15 parts of propionic acid, were added dropwise in the course of 30 minutes. This was followed by stirring at 50° C. for 3 hours, adjustment of the pH to 7.5 with dilute sodium hydroxide solution and further stirring at 50° C. for 2 hours. The isobutanol was then distilled off with steam, and the pigment was filtered off, washed with water and dried at 80° C. If this pigment thus obtained was dispersed in a concentration of 7% in the AM paint described, the high-gloss coatings prepared therewith were found to have a gloss value of 84. If the 7.5 parts of the addition product of Example 4 were replaced by 7.5 parts of water, matt coatings having a gloss value of 29 were obtained.

What is claimed is:
1. An addition compound comprising
50 equivalent % of structural units R of the formula

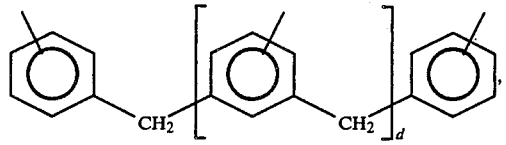

5 to 40 equivalent % of structural units of the formula (I)

$$-NH-CO-R^1-R^3-R^2 \qquad (I)$$

5 to 40 equivalent % of structural units of the formula (II)

$$-NH-CO-(R^4)_a-R^5-R^6 \qquad (II)$$

0 to 25 equivalent % of structural units of the formula (III)

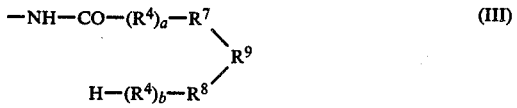

and/or
0 to 25 equivalent % of structural units of the formula (IV)

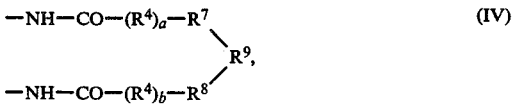

where (III) and (IV) cannot be 0 equivalent % at the same time and the sum (I)+(II)+(III)+(IV) is 50 equivalent %, having a molecular weight of 1,500 to 25,000, soluble in inert solvents, where d stands for a whole number from 0 to 6, $R^1$ stands for a direct bond, —O—, —NR$^{10}$R$^{11}$—, in which
  $R^{10}$ denotes a direct bond or $C_1$–$C_{20}$-alkylene and $R^{11}$ denotes —H, —OH or —NH$_2$,
$R^2$ stands for —H, —OH or —N(R$^3$R$^{11}$)(R$^{10}$R$^{12}$), in which
  $R^{10}$ and $R^{11}$ have the above meaning and $R^{12}$ denotes —H, —OH or —NH$_2$ and
$R^3$ denotes a direct bond or $C_1$–$C_6$-alkylene, or
$R^2$ stands for a saturated or unsaturated heterocyclic or an aromtic ring system having 2 to 16 carbon atoms which may be substituted by —R$^{13}$, halogen, —OR$^{13}$, —NR$^{13}$R$^{14}$, —COOR$^{13}$, —CONR$^{13}$R$^{14}$, —NR$^{13}$—COR$^{14}$, —CN, —CF$_3$ or —NO$_2$,
where
  $R^{13}$ and $R^{14}$ denote independently of each other —H or $C_1$–$C_4$-alkyl and where at least one of the radicals $R^1$ and $R^2$ must contain a nitrogen atom and $R^1$ is a direct bond only when $R^2$ stands for a heterocyclic ring system which is attached via the ring nitrogen, and $R^3$ likewise stands for a direct bond, R⁴ stand independently of each other for —O—R¹⁵—, —O—R¹⁵—CO— or —O—R¹⁵—O—CO—R¹⁶—CO—,
where
R¹⁵ denotes $C_2$-$C_{20}$-alkylene or phenylethylene and
R¹⁶ denotes a direct bond, $C_1$-$C_{12}$-alkylene, $C_6$-$C_{12}$-arylene or $C_6$-$C_{12}$-aralkylene and where the radicals R⁴ in the formulae (II), (III) and (IV) can in each case be different,
a stands for a whole number from 2 to 200,
R⁵ stands for —O—, —S—, —NH— or —NR'—, where R' has one of the meanings mentioned for R⁶,
R⁶ stands for a monovalent aliphatic, aromatic or araliphatic radical having 1 to 40 carbon atoms, and
R⁷ and R⁸ stand independently of each other for —O—, —S—, —NR"— or a direct bond, where R" has one of the meanings mentioned for R⁶,
R⁹ stands for a direct bond or a divalent aliphatic or araliphatic radical having 2 to 200 carbon atoms, where
R⁷, R⁸ and R⁹ are not a direct bond at the same time, and
b stands for a whole number from 2 to 200.

2. An addition compound as claimed in claim 1, wherein
R¹ stands for —O— or —NH—,
R² stands for a saturated or unsaturated heterocyclic ring system having 5 to 6 ring atoms, at least one of the radicals R¹ and R² containing a nitrogen atom,
R³ stands for an alkylene group having 1 to 6 carbon atoms.

3. An addition compound as claimed in claim 1, wherein in structural units of the formula (II)
R⁴ stands for —O—R¹⁵—, R⁵ stands for —O—
R¹⁵ stands for —CH₂CH₂—, —CH(CH₃)CH₂— and/or —CH₂CH(CH₃)—,
R⁶ stands for an alkyl, phenyl, naphthyl, alkylphenyl or alkylnaphthyl radical having 1 to 30 carbon atoms,
a stands for a number from 5 to 80 and the molecular weight of the radical —(R⁴)ₐ—R⁵—R⁶ is between 398 and 10,000.

4. An addition compound as claimed in claim 1, wherein in structural units of the formula (II)
R⁴ stands for —O—R¹⁵—CO—,
R¹⁵ stands for pentamethylene,
a stands for a number from 4 to 30 and
R⁵ and R⁶ have the abovementioned meaning and the radical —(R⁴)ₐ—R⁵—R⁶ has a molecular weight between 398 and 10,000.

5. An addition compound as claimed in claim 1, wherein the structural units of the formula (III) and (IV) the radicals

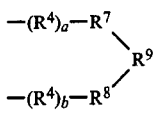

have a molecular weight between 397 and 9,999.

6. An addition compound as claimed in claim 3, wherein
R¹ stands for —O— or —NH—,
R² stands for a saturated or unsaturated heterocyclic ring system having 5 to 6 ring atoms, at least one of the radicals R¹ and R² containing a nitrogen atom,
R³ stands for an alkylene group having 1 to 6 carbon atoms and
wherein in structural units of the formula (III) and (IV) the radicals

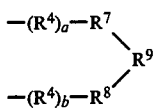

have a molecular weight between 397 and 9,999.

7. An addition compound as claimed in claim 4, wherein
R¹ stands for —O— or —NH—,
R² stands for a saturated or unsaturated heterocyclic ring system having 5 to 6 ring atoms, at least one of the radicals R¹ and R² containing a nitrogen atom,
R³ stands for an alkylene group having 1 to 6 carbon atoms and
wherein in structural units of the formula (III) and (IV) the radicals

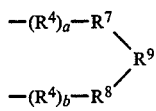

have a molecular weight between 397 and 9,999.

8. An agent for dispersing solids in organic media, which contains an addition compound as claimed in claim 1.

9. A process for preparing an addition compound as claimed in claim 1 which comprises reacting
(1) 50 equivalent % of a polyisocyanate of the formula

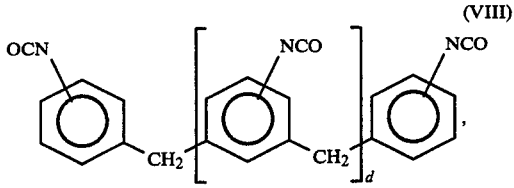

(VIII)

in which d is a whole number from 0 to 6, with
(2) 5 to 40 equivalent % of an amine of the formula

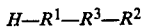

H—R¹—R³—R² in which R¹, R² and R³ have the meanings specified in claim 1, and
(3) 5 to 40 equivalent % of a monoactive polymer of the formula H—(R⁴)ₐ—R⁵—R⁶, in which R⁴, R⁵, R⁶ have the meanings specified in claim 1, and
(4) 1 to 25 equivalent % of a diactive polymer of the formula

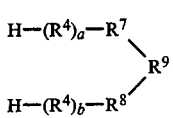

in which R⁴, R⁷, R⁸, R⁹, a and b have the meanings specified in claim 1,
the sum of reactants (2) to (4) being 50 equivalent %, in an inert solvent at a temperature of 0° to 120° C.

10. The process as claimed in claim 9, wherein in a first reaction stage the polyisocyanate is presented and reacted with the monoactive polymer and the product of the reaction is added in the second reaction stage to a mixture of the amine and the diactive polymer.

* * * * *